United States Patent [19]
Watkins

[11] Patent Number: 5,309,991
[45] Date of Patent: May 10, 1994

[54] WELLHEAD CONNECTOR
[75] Inventor: Bruce J. Watkins, Houston, Tex.
[73] Assignee: Dril-Quip, Inc., Houston, Tex.
[21] Appl. No.: 26,511
[22] Filed: Mar. 4, 1993
[51] Int. Cl.[5] .......................................... E21B 33/038
[52] U.S. Cl. .................................... 166/77.5; 166/83; 166/85; 285/18; 285/309
[58] Field of Search ..................... 166/77.5, 338, 340, 166/344, 348; 285/18, 29, 33, 86, 309, 404, 406

[56] References Cited
U.S. PATENT DOCUMENTS

| | | | |
|---|---|---|---|
| 2,868,565 | 1/1959 | Suderow | 285/406 |
| 3,155,401 | 11/1964 | Musolf | 285/309 |
| 3,827,728 | 8/1974 | Hynes | 285/309 |
| 4,094,539 | 6/1978 | Reimert | 285/309 |
| 4,453,745 | 6/1984 | Nelson | 285/18 |
| 4,496,172 | 1/1985 | Walker | 285/18 |
| 4,564,068 | 1/1986 | Baugh | 166/85 |
| 4,856,594 | 8/1989 | Jennings | 166/338 |
| 4,902,044 | 2/1990 | Williams et al. | 285/18 |
| 4,976,458 | 12/1990 | Hosie et al. | 166/348 |
| 5,149,143 | 9/1992 | Howell . | |

Primary Examiner—Ramon S. Britts
Assistant Examiner—Frank S. Tsay
Attorney, Agent, or Firm—Vaden, Eickenroht, Thompson, Boulware & Feather

[57] ABSTRACT

There is disclosed a wellhead connector for connecting first and second tubular wellhead members in end-to-end relation, wherein locking segments are carried by a ring about the first member for movement between an outer position, to permit the ring to be moved over an outer surface of the second member, to an inner position in which locking shoulders on the inner ends of the locking segments slidably engage a locking shoulder about the outer surface of the second member to urge the ends of the members into tight engagement. The locking segments are moved to their inner positions by means of wedges guidably movable in the ring outwardly of the locking segments and having surfaces slidable over surfaces on the outer ends of the segments as the wedges are moved toward one another, and are moved to their outer positions, as the wedges move away from one another, by means of coil springs acting between the body and locking segments.

5 Claims, 3 Drawing Sheets

WELLHEAD CONNECTOR

This invention relates generally to a wellhead connector for connecting tubular wellhead members in end-to-end relation. More particularly, it relates to improvements in connectors of this type in which locking segments are carried by a ring about a first member for movement from an outer position, to permit the ring to be moved over the outer surface of the second member, to an inner position in which locking shoulders on the inner ends of the segments slidably engage a locking shoulder about the outer surface of the second member to urge the ends of the members into tight engagement.

In conventional connectors of this type, such as that shown in U.S. Pat. No. 5,149,143, the locking segments are moved between their inner and outer positions by means of bolts threadedly mounted on the ring for radial movement in response to manipulation of their outer ends from the exterior of the ring, and connected at their inner ends to the locking segments. As will be understood, the force with which the locking shoulders on the segments engage with the locking shoulder on the first tubular wellhead member, as they are moved inwardly, is limited by the cross-sectional area of the bolt, which may be in the order of only one square inch. Additionally, there is a tendency for the locking segments to bend outwardly at their ends on opposite sides of their connection to the bolts as the locking shoulders on the segments are forced against the locking shoulder about the second member, thus reducing the contact area over which the locking shoulders are effective. Also, in conventional connectors of this type, the mechanical advantage for moving the ends of the members into tight engagement stems only from the vertical component of the angle of the conical locking surfaces.

An object of this invention is to provide a connector of this type in which the locking segments may be moved inwardly to locking position with greater force, and, more particularly, in which the ends of the locking segments are prevented from bending outwardly to insure full contact between the locking surfaces on their inner ends and the locking shoulder about the first member.

This and other objects are accomplished, in accordance with the illustrated and preferred embodiment of the invention, by a connector of the type described wherein, as in prior connectors of this type, locking segments having locking shoulders on their inner ends are guidably mounted in circumferentially spaced relation about the ring to dispose the locking shoulders opposite the locking shoulder on the second member. However, in accordance with one novel aspect of the invention, the segments are moved between their outer and inner positions by means which includes wedges mounted on the body for guided movement transversely of the direction of movement of the locking segments in first directions toward one another and second directions away from one another, and having wedging surfaces which are engagable with wedging surfaces on the locking segments to force the locking segments from their outer to their inner positions, as the wedges are moved in their first directions, but permit them to move to their outer positions as the wedges are moved in their second directions. More particularly, the wedges are moved between such positions by means which, in the preferred embodiment of the invention, comprises a bolt extending through both wedges and having oppositely turned threads engagable with both, whereby the bolt may be turned to move the wedges in the desired directions. Preferably, the bolt is manipulatable from either of its ends exteriorly of the ring.

Thus, the force for moving the locking segments to their inner positions is transmitted over the area of the wedging surfaces of the wedges, which may be almost as large as the area of the outer ends of the segments. As will also be understood, this wide area of contact between the wedging surface on the wedges and locking segments will prevent the outer ends of the segments from bending outwardly as the locking segments are moved into locking position. Still further, the small angles formed between the wedging surfaces and a plane perpendicular to the direction of movement of the locking segments multiplies the mechanical advantage afforded by the locking shoulders on the segments and second tubular member as the segments are moved to their inner positions.

In the illustrated embodiment of the invention, a means such as a spring acts between the ring and segments to yieldably urge the segments to their outer positions. Hence, as the wedges are moved to their second positions, the locking segments are automatically returned to their outer positions.

In the drawings, wherein like reference characters are used throughout to designate like parts:

Figures 1, 2:
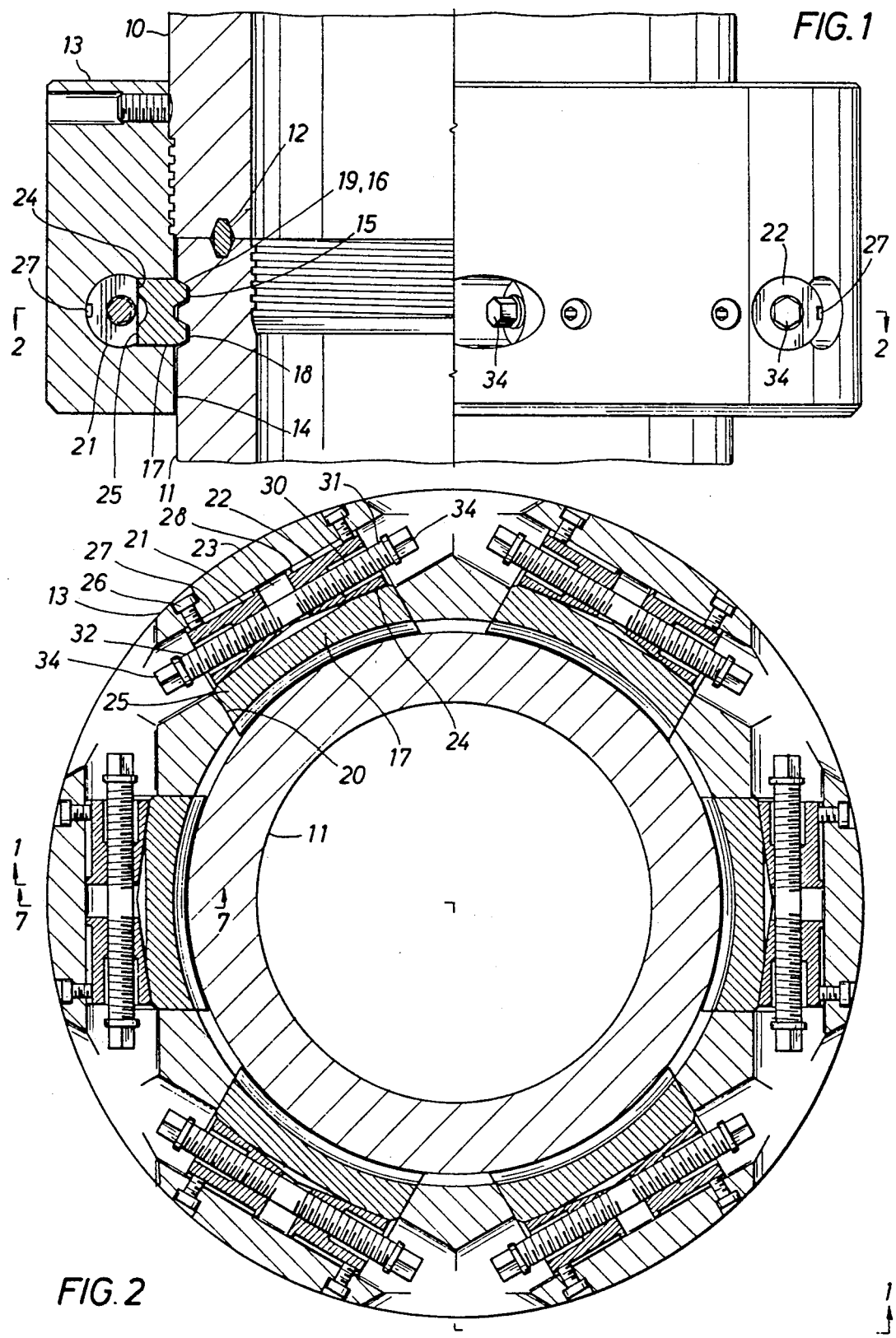
FIG. 1 is a view, partially in elevation and partially in section, as seen along broken lines 1—1 of FIG. 2, of a wellhead connector constructed in accordance with the present invention and with the locking segments thereof moved into locking position.
FIG. 2 is a cross-sectional View of the connector of FIG. 1, as seen along broken lines 2—2 thereof.
Figures 3, 4:
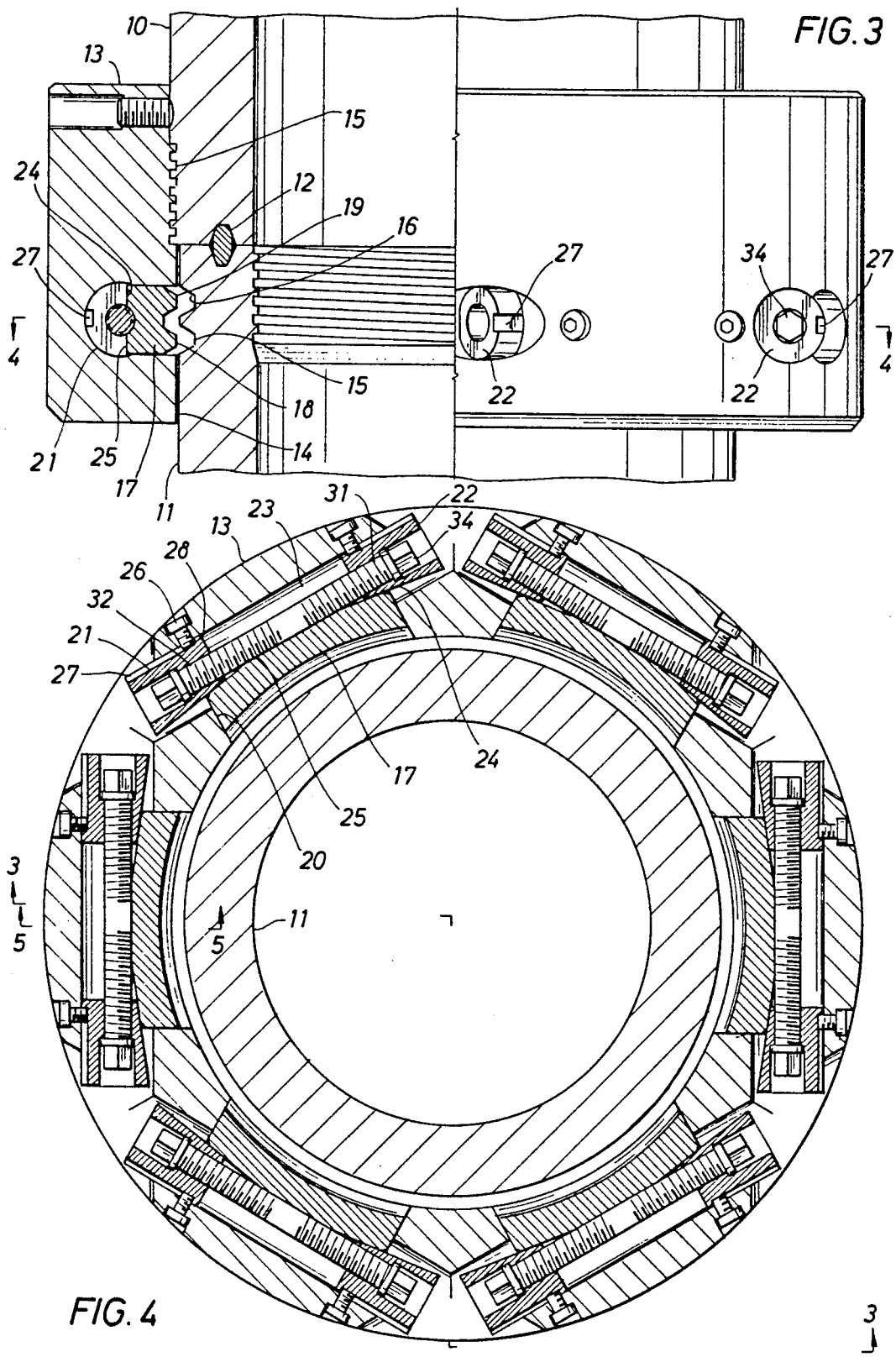
FIG. 3 is a view similar to FIG. but with the locking segments in their outer unlocking positions.
FIG. 4 is a cross-sectional view of the connector, as seen along broken lines 4—4 of FIG. 3.

With reference now to the details of the above described drawings, the over-all connector is best shown in FIGS. 1 and 3 to include a first or upper tubular wellhead member 10 and a second tubular wellhead member 11 disposed in end-to-end relation with respect to the first member. As shown, a metal gasket 12 is compressed between grooves in the opposite ends of the tubular members as they are moved into engagement with one another.

As previously described, the connector also includes a ring 13 about the first tubular member and having a bore 14 therein which is fittable closely about the outer surface of the second tubular member when the members are in end-to-end relation, as shown in FIGS. 1 to 3. More particularly, in the illustrated embodiment of the invention, the ring is mounted about the first tubular member by means of threads, although the invention contemplates that the ring may be otherwise mounted thereon or integral with the first member.

Locking segments 17 are guidably mounted in circumferentially spaced-apart relation about the ring and inwardly as the wedges are moved toward one another and permit the locking segments to be moved outwardly as the wedges are moved away from one another.

As shown, the outer sides of the wedges and the guideway for them are generally cylindrical, and pins 26 are carried about the outer side of the ring 13 for movement into slots 27 formed in the back side of the wedges so as to prevent them from rotating, whereby the flat slidable surfaces 24 and 25 on the wedges and outer ends of the locking segments are maintained parallel to one another. The wedges are of such length that they will remain spaced as they move toward one another to urge the locking segments to their inner positions. On the other hand, stops 28 are formed on the inner ends of the slots 27 so as to prevent the wedges from being moved out of the slot 23.

As previously described, the wedges are moved toward and away from one another by means of a bolt 30 having oppositely turned threads 31 and 32 at each end threadedly extending through oppositely facing threads of the same turn in the wedges. Hence, rotation of the bolt in one rotational sense will cause the wedges to be moved simultaneously toward one another, and in the opposite directional sense to cause the wedges to be simultaneously moved away from one another. As shown, the ring is formed with recessed areas in its outer sides intermediate the slots so as to permit installation and removal of the wedges. These recessed areas also provide access to heads 34 formed on each end of the bolt to permit it to be reached by a suitable tool.

Figure 5:
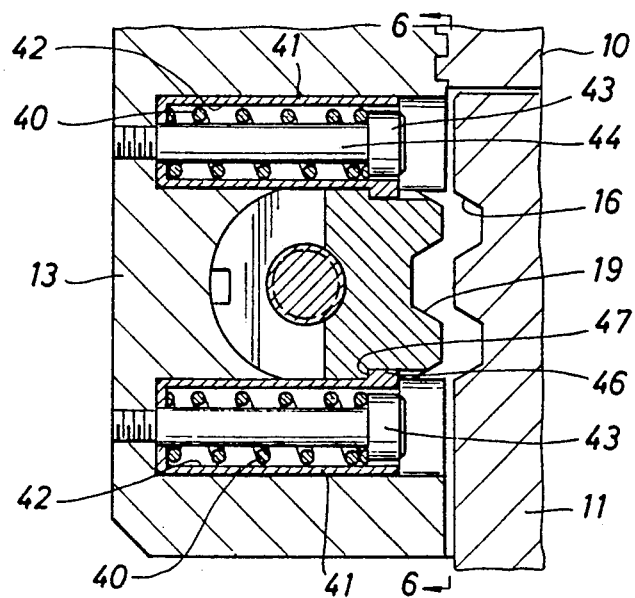
FIG. 5 is an enlarged partial vertical sectional view of the connector, as seen along broken lines 5—5 of FIG. 4.
Figure 6:
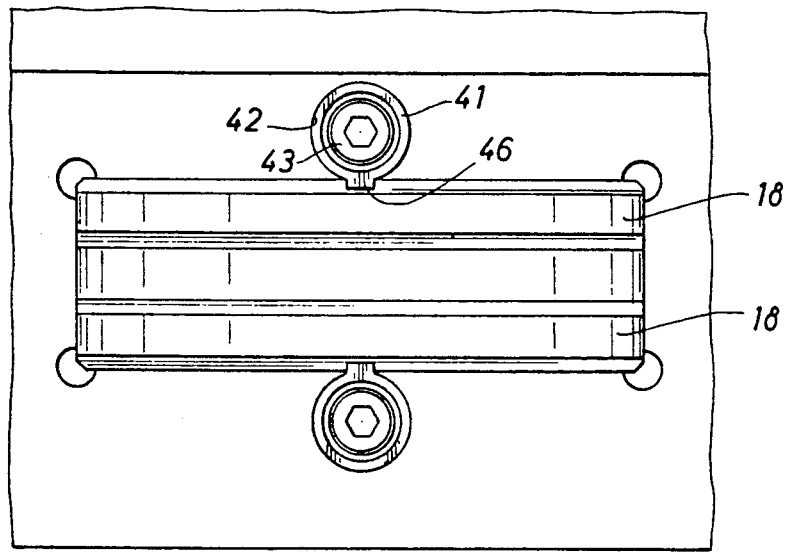
FIG. 6 is a view of the inner ends of the locking segments, as seen along broken lines 6—6 of FIG. 5.
Figure 7:
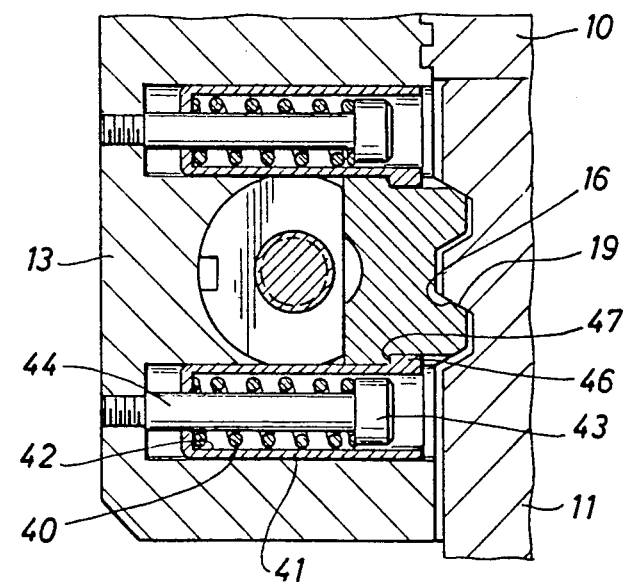
FIG. 7 is a partial sectional view similar to FIG. 5, but with the locking segments in their locking positions.

As shown in FIGS. 5 to 7, coil springs 40 mounted within radial slots 42 extending inwardly from the bore of the ring above and below each of the locking segments are have teeth 18 in their inner ends which form upwardly facing locking shoulders 19, which are disposed opposite downwardly facing locking shoulders 16 formed on grooves 15 formed about the lower tubular member when the upper tubular members are disposed in end-to-end relation therewith. More particularly, the conical locking surfaces on both the locking segments and on the lower tubular member extend downwardly and outwardly at relatively small angles with respect to the axis of the tubular members.

Thus, as the locking segments are moved inwardly from their outer positions of FIG. 3, in which the ring may be moved vertically about the surface of the lower member, to their inner positions of FIG. in a manner to be described to follow, their locking surfaces 19 are caused to slide along the locking surfaces 16 of the lower tubular member so as to force the upper end of the lower tubular member into tight engagement with the end of the first upper tubular member. More particularly, due to the taper of the locking surfaces on the lower tubular member and locking segments, provide a large upward component of force urging the ends of the tubular members tightly into engagement with one another.

As shown, guideways or slots 20 are formed in circumferentially spaced-apart relations about the bore 14 of the ring 13, each to closely receive a locking segment 17 for guidably sliding between its inner and outer positions. Each of the locking segments is moved from its outer to its inner position by means of a pair of wedges 21, 22 received within a transversely extending slot 23 in the body outwardly of the guideway 20. More particularly, each of the wedges 21 and 22 has an inner surface 24 which is slidable over surfaces 25 on the outer ends of the locking segments so as to wedge the locking segments arranged to act between the ring and locking segments in order to yieldably urge the locking segments to their outer positions, whereby, upon movement of the wedges away from one another, the locking segments are moved outwardly to their outer positions. Thus, each spring is compressed between a flange on the inner end of a tube 41 received in the slot 42 and a head 43 on the inner end of a bolt 44 which extends through the tube end and anchored at its outer end to the body. More particularly, the inner end of each tube has a tab 46 received within a slot 47 on the top and bottom of the locking segment, so that, when compressed between the flange on the outer end of the tube and the enlarged head 45 of the bolt, the spring urges the locking segment outwardly. As the wedges move toward one another to move the locking segments inwardly to locking position, as shown in FIG. 7, the springs are further compressed to increase the force they will exert on the segments to move them to their outer positions as the wedges are moved away from one another.

It will be understood that the small angle which the locking surfaces on the wedges and the outer ends of the locking segments over which they are slidable will provide a large inward component of force for moving the locking segments inwardly with large mechanical advantage. This, of course, together with the mechanical advantage of the tapered surfaces about the lower tubular member and the inner ends of the locking segments will provide an over-all mechanical advantage of considerable extent for moving the ends of the tubular members into tight engagement with one another. More particularly, the angle between the wedging surfaces is preferably smaller than the friction angle between them, so that the segments will remain held in their locking positions, even though the bolt is lost, due to fire or otherwise.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A wellhead connector, comprising
   a first tubular wellhead member,
   a second tubular wellhead member having a conical locking surface about the outer surface,
   a ring surrounding the first tubular member having a bore therein fittable closely surrounding the outer surface of the second member when the members are in end-to-end relation,
   locking segments having locking shoulders on their inner ends and guidably mounted in circumferentially spaced relation about the ring to dispose the locking shoulders opposite the locking shoulder on the second member,
   means for moving the segments between outer positions in which their inner ends are removed from the bore and inner positions in which their locking shoulders slidably engage the locking shoulder on the second member to urge the ends of the members tightly against one another, including wedges mounted on the body for guided movement generally transversely of the direction of movement of the locking segments in first directions toward one another and second directions away from one another, and having wedging surfaces which are engagable with wedging surfaces on the locking segments to force the locking segments from their outer to their inner positions, as the wedges are moved in their first directions, but permit them to move to their outer positions as the wedges are moved in their second directions, and means for moving the wedges between their first and second positions.

2. A wellhead connector according to claim 1, including means acting between the ring and the locking segments to yieldably urge the locking segments toward their outer positions, whereby the segments are automatically returned to their outer positions upon movement of the wedges to their second positions.

3. A well head connector according to claim 1, wherein the means for so moving the wedges comprises a bolt extending through both wedges and having oppositely turned threads engagable with both.

4. A well head connector according to claim 3, wherein the bolt is manipulatable from either of its ends exteriorly of the ring.

5. A well head connector according to claim 1, wherein the ring is threadedly connected about the outer surface of the first member.

* * * * *